Oct. 27, 1931.     G. PIESSEVAUX     1,829,187
METHOD OF MAKING COLORED COMPOSITION SLABS
Filed Nov. 14, 1929
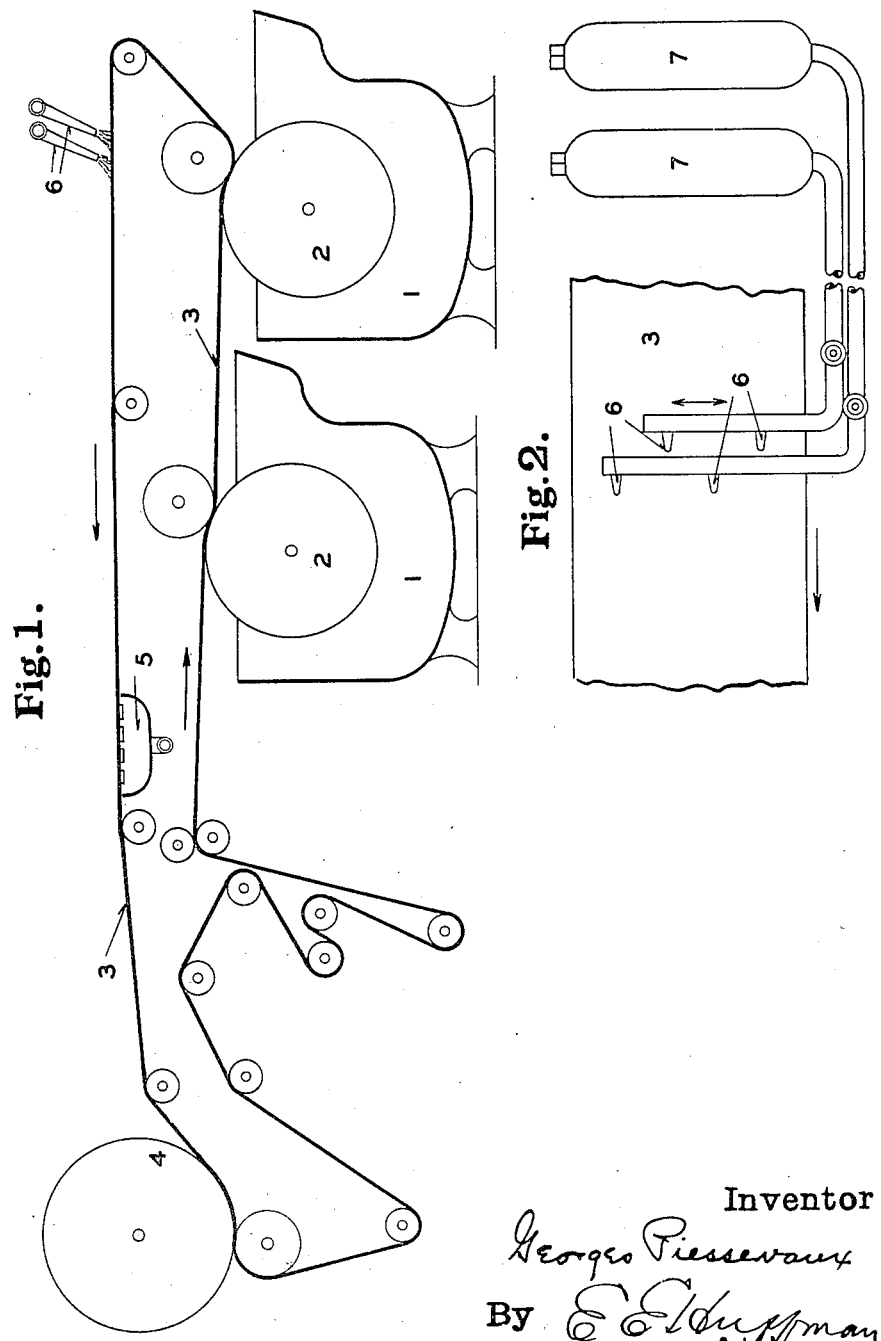
Inventor
Georges Piessevaux
By E. E. Huffman
Atty.

Patented Oct. 27, 1931

1,829,187

UNITED STATES PATENT OFFICE

GEORGES PIESSEVAUX, OF ST. LOUIS, MISSOURI, ASSIGNOR TO ETERNIT, INC., OF ST. LOUIS, MISSOURI, A CORPORATION OF DELAWARE

METHOD OF MAKING COLORED COMPOSITION SLABS

Application filed November 14, 1929. Serial No. 407,028.

My invention pertains to a method and means of coloring cement composition sheets or slabs used as shingles, building boards, and for other purposes.

The only method known to me which has been heretofore successfully employed to impart color to these slabs is to mix the coloring material with the cement fiber mixture of which they are made, but this method has the disadvantage that even if the coloring material is mixed only with the portion of the cement fiber material which forms the surface layer of the slab, a large amount of coloring material is required per unit of surface, and it is also impossible to produce any color effect on the surface of an individual slab other than that of a single color uniformly distributed.

The usual method of forming a cement fiber slab is to apply the wet cement fiber mixture by means of a porous belt to an accumulator roll, the apparatus being similar to that employed in the manufacture of cardboard.

In Figure 1 of the accompanying drawings the apparatus referred to is diagrammatically illustrated, this figure and Figure 2 also illustrating the color applying means added for the purpose of my invention.

A mixture of hydraulic cement and fiber, such as asbestos, together with a large amount of water, is contained in one or more vats 1 in which rolls 2 rotate in contact with a travelling porous fabric belt 3 and convey the mixture from the vats to the belt. The belt moves in contact with the rotating accumulator roll 4 to which the mixture is thereby transferred, and when the material on the accumulator roll has reached the desired thickness it is removed therefrom and subjected to pressure to remove the surplus water, after which the cement hardens or "sets" to form a stone-like slab.

In accordance with prior processes for imparting color to these slabs, either the coloring ingredient would be incorporated in all of the mixture used in forming them, or only one vat, (such, for example, as the one shown on the right hand side of the drawing) would contain the colored cement fiber mixture and its distributing roll would either be kept out of contact with the belt, except during the proper time to apply a colored layer as the first layer on the accumulator roll, or water would be sprayed on the distributing roll in the vat of color material to prevent this material from reaching the belt except during the period referred to.

The prior coloring method just described, produced a slab having its colored portion an integral part of the finished slab and, therefore, not subject to peeling or cracking off, but involved additional machine elements and manipulation, and a considerable amount of coloring material, which is expensive.

I have found that by spraying, by a nozzle or nozzles 6, on the portion of the surface of the material on the belt which forms an outer layer of the slab, (the first layer on the accumulator roll) a dilute solution of coloring material in water, I can obtain a sufficient incorporation of the coloring material in the surface portion of water-cement-fiber mixture on the belt to satisfactorily color the slabs, including sufficient penetration of coloring material to produce a durable colored surface, this penetration being apparently due partly to the force of contact of the coloring solution with the wet cement-fiber mixture; partly to the intermingling of the water carrying the color with the water of the cement-fiber mixture; and partly to the effect of suction which I apply beneath the mixture on the belt by means of the suction device 5, which is a box connected to a suction pump and having longitudinal openings in its top over which the belt passes. The effect of suction is to withdraw surplus water from the mixture and this tends to convey the color into the material of the layer of mixture on the belt as it passes over the suction device.

The spray nozzles 6 are shown spaced transversely of the direction of motion of the belt and two nozzle supply reservoirs 7 are shown, whereby two colors could be simultaneously sprayed is desired. It is obvious that the number of colors applied and the relative spacing of the nozzles may be varied as desired.

By my process a sufficient color effect for most uses can be obtained by means of only a fraction of the amount of coloring material required when that material is mixed with the cement-fiber composition in accordance with the prior practice hereinabove referred to. My process has the further very great advantage that a color need not be applied to the entire surface and that by supplying coloring material of the desired color to selected nozzles, I may apply more than one color to the slab and may also apply these colors in irregular lines by transversely reciprocating the spray nozzles as the material passes them. When the surface is colored in bands—or in spots as by intermittently cutting off the spray while the slab material is passing it—the spraying method also produces gradation in color from the center of a sprayed band or spot to the edge, thus merging the natural gray color of a Portland cement-asbestos fiber composition into the color of the pigment applied whereby there is no distinct dividing line between the colors of the surface of the finished product and the appearance thus enhanced. When the entire, or a selected area of the surface is to be colored but not with a single color, the spraying method results in an attractive blending into each other of adjacent areas of different color.

Having fully described my invention, what I claim as new and desire to secure by Letters Patent of the United States is:

1. The method of producing a colored surfaced slab from a mixture of water and cementitious material which comprises reducing said mixture to sheet form and spraying on one surface thereof a liquid containing a pigment of a color differing from that of the cementitious material, said spray being applied while the mixture contains a substantial quantity of water and before the cementitious material has hardened.

2. The method of producing a colored surfaced slab from a mixture of water and cementitious material which comprises applying said mixture to an accumulator roll by means of a conveyor to produce a sheet of desired thickness and spraying a liquid containing the desired color pigment on that part of the material which forms the first layer on the accumulator roll and while said material is on the conveyor and contains a substantial portion of water.

3. The method of producing a colored surfaced slab from a mixture of water and cementitious material which comprises applying said mixture to an accumulator roll by means of a conveyor to produce a sheet of desired thickness and spraying a liquid containing the desired color pigment on that part of the material only which forms the first layer on the accumulator roll and while said material is on the conveyor and contains a substantial portion of water.

4. The method of producing a colored surfaced slab from a mixture of water and cementitious material which comprises applying said mixture to an accumulator roll by means of a porous conveyor belt to produce a sheet of desired thickness, spraying a liquid containing the desired color pigment on that part of the material which forms the first layer on the accumulator roll and while said material is on the belt and contains a substantial portion of water, and applying suction to the material on the belt on the side opposite the sprayed side to withdraw a substantial portion of the water from the material.

5. In apparatus for the manufacture of cement-fiber slabs, the combination of a porous conveyor belt, means to supply a mixture of cement, fiber and water to the belt, an accumulator roll contacting with the belt to transfer the material from the belt to its periphery, means for spraying a liquid containing color material upon the mixture on the belt, and suction means operating on the side of the material opposite the sprayed side to withdraw a substantial portion of the water from the material after it is sprayed and before it is transferred to the accumulator roll.

6. In apparatus for the manufacture of cement-fiber slabs, the combination of a conveyor, means to apply a mixture of cement, fiber and water to the conveyor, an accumulator roll contacting with the conveyor to transfer the material from the conveyor to its periphery, and means for spraying a liquid containing color material upon the portion of the mixture on the conveyor which forms a surface of the finished slab, said means comprising spray nozzles so spaced apart transversely of the conveyor that parts of the surface of the slab receive less color material than others.

7. In apparatus for the manufacture of cement-fiber slabs, the combination of means to convey wet cementitious material in sheet form, a plurality of spray nozzles spaced transversely of the direction of motion of said sheet and each adapted for spraying on a portion only of said wet material a liquid containing color pigment, means for supplying to one of said nozzles a pigment liquid of a selected color, and means for supplying a pigment liquid of a different color to another nozzle transversely spaced therefrom.

In testimony whereof, I hereunto affix my signature this 30th day of October, 1929.

GEORGES PIESSEVAUX.